Figure 1:
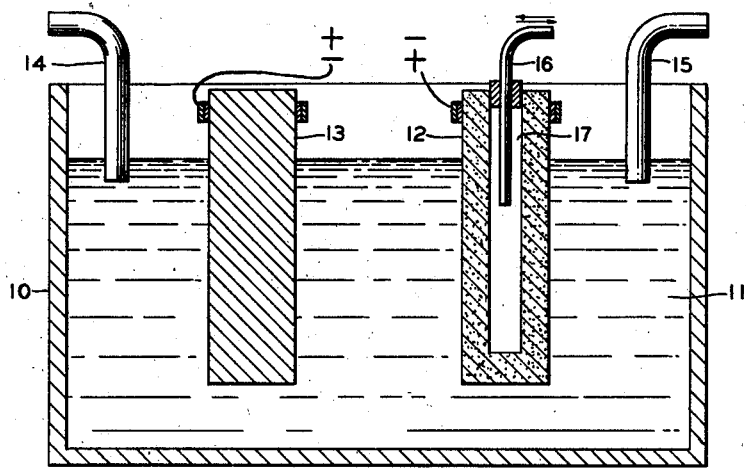

Feb. 17, 1942.                G. W. HEISE ET AL                2,273,796
      METHOD OF ELECTROLYTIC PREPARATION OF NITROGEN COMPOUNDS
                     Original Filed Dec. 31, 1936

INVENTORS
GEORGE W. HEISE
ERWIN A. SCHUMACHER
BY
ATTORNEY

Patented Feb. 17, 1942

2,273,796

UNITED STATES PATENT OFFICE 2,273,796

METHOD OF ELECTROLYTIC PREPARATION OF NITROGEN COMPOUNDS

George W. Heise, Rocky River, and Erwin A. Schumacher, Lakewood, Ohio, assignors to National Carbon Company, Inc., a corporation of New York Original application December 31, 1936, Serial No. 118,472. Divided and this application December 17, 1938, Serial No. 246,278

5 Claims. (Cl. 204—74)

The invention relates to electrolytic processes wherein an impressed electric current is passed through a cell having electrodes immersed in an aqueous electrolyte. This application is a division of our application Serial No. 118,472, filed December 31, 1936.

In its broad aspect, the invention comprises the use of porous electrodes to achieve one or more of the following objects:

(a) To decrease the voltage drop through, and the power consumption of, the cell;

(b) To provide for the introduction of one or more chemical reactants into the cell;

(c) To provide a situs for desired chemical reactions;

(d) To provide for the removal of one or more products from the cell, in some instances in relatively concentrated form, and (e) To increase the useful life of the electrodes.

The heart of the invention lies in the provision of an electrode having an effective surface area in contact with the electrolyte many times greater than the apparent or superficial area of contact, the body of the electrode being permeable either to gases alone or to both gases and liquids. Such an electrode consists, for example, of a porous or foraminous body of conductive material, preferably carbon, the dimensions of the pores and inner passages being extremely minute, as further described below.

We are aware that it has been heretofore proposed to use carbon electrodes possessing some permeability to fluids, in various electrolytic processes in an attempt to achieve one or more of the above objects; but none of these proposals has been capable of satisfactory practical application. We have found that many of the difficulties experienced by prior workers may be overcome by the use of an improved electrode material. Specifically, we have found that the electrode material should have a porosity above 35% (preferably between 40% and 70%), calculated as follows: % porosity=100 (real density—apparent density)÷real density. Further, the electrode material should have an air permeability above 15, and preferably above 30. Whenever used herein and in the appended claims, the term "air permeability" means the number of cubic inches of air per minute passing through one square inch cross-section of electrode material, when air at a pressure of one pound per square inch is blown through a block of the material one inch thick. The following table shows, for purposes of comparison, the porosity and permeability of ordinary electrode carbons (types 1, 2, and 3) and of the special electrode carbons included in this invention (types 4, 5, 6, and 7).

| Type | Porosity | Air permeability |
|---|---|---|
| | Per cent | |
| 1 | 25 | 2 |
| 2 | 28 | 7 |
| 3 | 33 | 2 |
| 4 | 60 | 20 |
| 5 | 57 | 30 |
| 6 | 40 | 120 |
| 7 | 42 | 600 |

We have also found that the pores of the electrode material should be relatively minute and uniformly distributed, and not large, scattered voids and fissures. Material having the latter kind of pores might be described as "leaky" rather than "porous." The relative uniformity of distribution of the pores in the two kinds of materials may be distinguished by a simple test: if air is forced through a thin block of the material under water, at about the minimum air pressure required to obtain bubbles in the water, the "porous" material gives forth a cloud of small bubbles over its entire surface, while the "leaky" material gives a number of separate streams of bubbles issuing from the larger fissures and voids.

Another test for uniformity of porosity of these materials comprises determining the flow of a viscous liquid, such as a concentrated aqueous solution of cane sugar, under a moderate pressure, for instance a head of about six inches, through a thin (e. g. one-eighth inch) section of the material. Any relatively large fissures permit flow of the solution and are thereby made evident.

Porous electrode material within this invention may be made from comminuted solid carbonaceous material (for example, coke, graphite, or charcoal) and a porous carbonaceous binder (for instance, baked tar or pitch). Suitable methods for making such electrode material are described in U. S. Patent 1,988,478, issued on January 22, 22, 1935, to B. E. Broadwell and L. C. Werking.

In some processes the kind of solid carbon chosen for the electrode material will make little or no difference; in other processes it will be desirable or necessary to take advantage of the fact that graphite has a higher oxygen over-voltage than coke, and that coke has a higher oxygen over-voltage than charcoal. Otherwise stated, in a given instance either a high or a low overvoltage may be influential, and the overvoltage characteristics may be accordingly controlled by a proper choice of electrode material.

Figure 2:
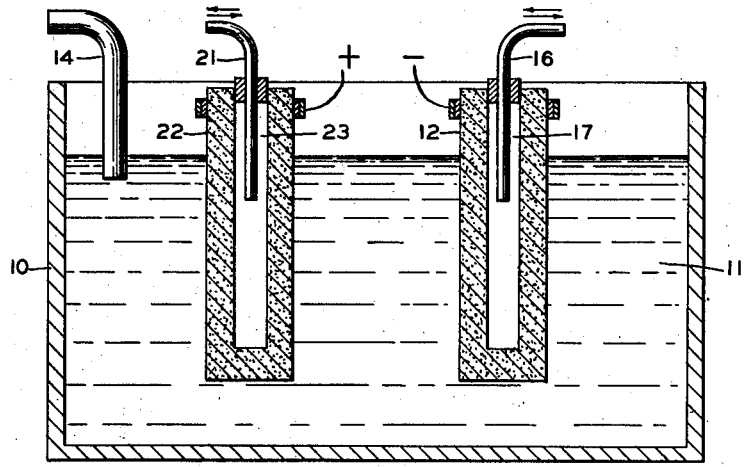

The practical application of the above-described new electrode material to electrolytic processes, according to this invention, will be described in connection with the attached drawing, in which Fig. 1 represents diagrammatically in vertical cross-section an electrolytic cell container 10 containing an electrolyte 11 in which are immersed a porous electrode 12 and a nonporous electrode 13, and Fig. 2 represents diagrammatically in vertical cross-section an electrolytic cell similar to that shown in Fig. 1 except that it contains two porous electrodes 12 and 22.

The device illustrated in Figure 1 may be used in cases where it is desired to introduce one or more reactants into the cell, or to remove one or more reaction products from the cell, through only one electrode.

Examples of processes in which a reactant may advantageously be introduced into the cell through a single electrode 12 involve the electrowinning of copper and zinc with the assistance of sulfur dioxide acting as an anodic depolarizer and leach-liquor regenerator.

These electrowinning processes are described in detail in our copending application Serial Number 118,472, of which this application is a division. These processes illustrate the use of a porous anode and a solid cathode. It will frequently be desired, of course, to use a solid anode and a porous cathode. For instance, the latter arrangement may be used to advantage in the cathodic reduction of nitrobenzene to p-aminophenol. In such a process, a cell 10 may be used which includes a solid anode 13 and a porous carbon cathode 12, which are immersed in a suitable electrolyte 11, for instance a normal solution of sulfuric acid. Nitrobenzene may be introduced into the cell through the cathode 12. At the cathode, the nitrobenzene is reduced cathodically to p-aminophenol which rises to the top of the electrolyte where it may be collected and removed.

Another process employing a porous cathode comprises electrolyzing sodium chloride brine in a cell 10 and passing nitric acid or nitrogen peroxide into the cell through a porous carbon cathode 12. Nitric acid or nitrogen peroxide depolarizes the cathode to form nitric oxide, and the cell reactions may be written, for the former case:

$6NaCl + 8HNO_3 = 6NaNO_3 + 2NO + 3Cl_2 + 4H_2O$

Provision may be made to collect the chlorine and nitric oxide separately, and the nitric oxide may readily be oxidized and converted to nitric acid in known manner. Whereas ordinary methods of brine electrolysis require about 3.6 volts, the use of nitric acid depolarization permits operation at much lower voltages, e. g. at about 1.8 volts.

It may sometimes be desirable to use, in connection with processes within this invention, a porous anode through which electrolyte is introduced or removed or through which an anodic depolarizer is introduced into the cell. It may also be desirable in some instances to use a diaphragm.

It will be observed that, whenever a material is introduced into the cell through a porous electrode, the electrode serves as an efficient distributor of such material. An effect of the extended nature and chemical composition of the surface of these porous carbon electrodes which is often observed is to promote certain reactions, and one beneficial practical result is an increased efficiency of depolarization. Thus, in a given instance the porous carbon electrode may serve several functions simultaneously to achieve the general objects of the invention.

Although several specific processes have herein been described in detail, it will readily be understood that these descriptions are presented only by way of examples illustrating certain aspects of the invention, and that the invention is not limited to or by such examples. Furthermore, although one shape of electrode is shown in the attached drawing as an example, the invention is not limited to that or any other specific shape. For instance, under some circumstances it may be desired to provide non-porous portions in the electrode, or to adopt a special shape, in order to regulate the distribution of fluid flowing through the electrode, or for another reason. It may also be advantageous to place a porous electrode or electrodes, not provided with a central well 17 or 23, at the end or ends of the cell container 10 in such a manner that a space is left between the electrode and the container, which space may be used to serve the functions of the central well 17 or 23 described herein.

We claim:

1. Process for electrolytically reducing a nitro group of a compound containing such group which comprises passing said compound through a porous cathode into an electrolytic cell containing said cathode, an electrolyte, and an anode, and passing an electric current through the electrolyte between the cathode and anode; said cathode having a porosity above 35% and an air permeability above 15 and comprising comminuted solid carbonaceous material embedded in a porous carbonaceous binder having uniformly distributed pores.

2. Process of reducing nitrobenzene which comprises passing the nitrobenzene through a porous cathode into an electrolytic cell containing said cathode, an anode, and an electrolyte, and passing an electric current through the electrolyte between the cathode and anode; said cathode having a porosity above 35% and an air permeability above 15 and comprising comminuted solid carbonaceous material embedded in a porous carbonaceous binder having uniformly distributed pores.

3. Process of reducing nitrobenzene to p-aminophenol which comprises passing an electric current through an electrolyte between an anode and a porous cathode having a porosity between 40% and 70% and an air permeability above 30 and comprising comminuted solid carbonaceous material embedded in a porous carbonaceous binder having uniformly distributed pores; and passing nitrobenzene through said cathode into said electrolyte.

4. Process of electrolyzing halide brine which comprises passing the brine into an electrolytic cell containing an anode and a porous cathode, the cathode having a porosity above 35% and an air permeability above 15 and comprising solid comminuted carbonaceous material embedded in a porous carbonaceous binder having uniformly distributed pores; passing an electric current through the anode, cathode, and electrolyte; and passing into the cell through the porous cathode a material selected from the group consisting of nitric acid and higher oxides of nitrogen.

5. Process of electrolyzing halide brine which comprises passing the brine into an electrolytic cell containing an anode and a porous cathode, the cathode having a porosity between 40% and 70% and an air permeability above 30 and comprising solid comminuted carbonaceous material embedded in a porous carbonaceous binder having uniformly distributed pores; passing an electric current through the anode, cathode, and electrolyte; and passing into the cell through the porous cathode a material selected from the group consisting of nitric acid and higher oxides of nitrogen.

GEORGE W. HEISE.
ERWIN A. SCHUMACHER.